Nov. 21, 1933.　　　　O. SMITH　　　　1,935,784
CLINICAL MULTITHERMOMETER
Filed June 21, 1930　　　3 Sheets-Sheet 1
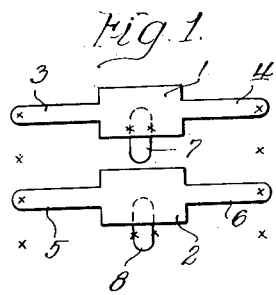
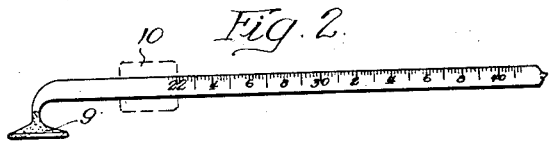
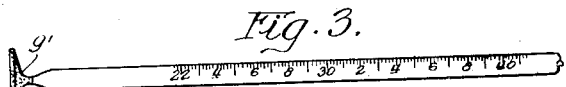
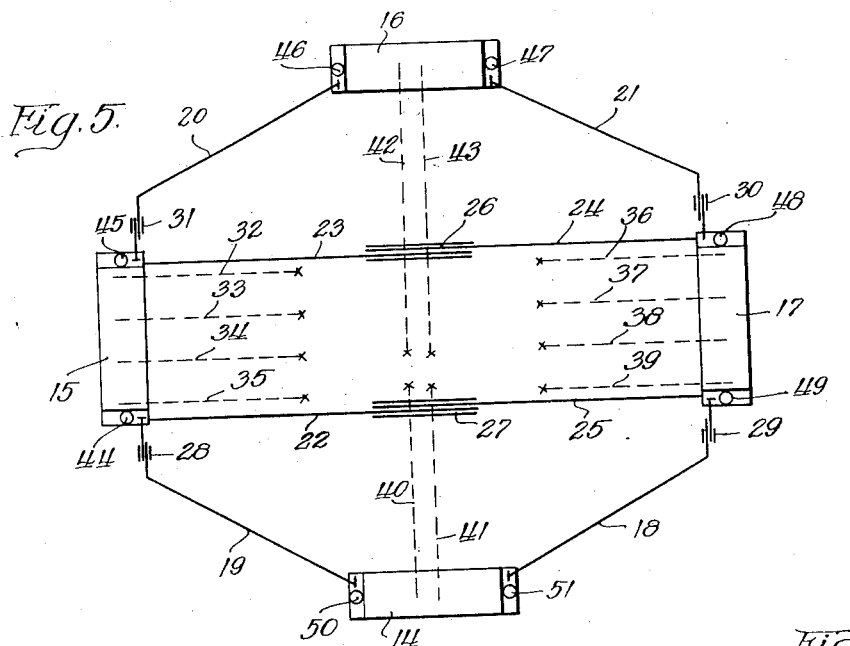
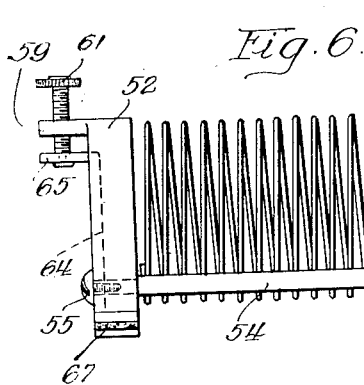
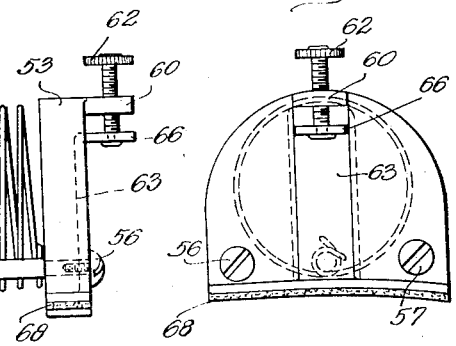
Inventor
Oakley Smith

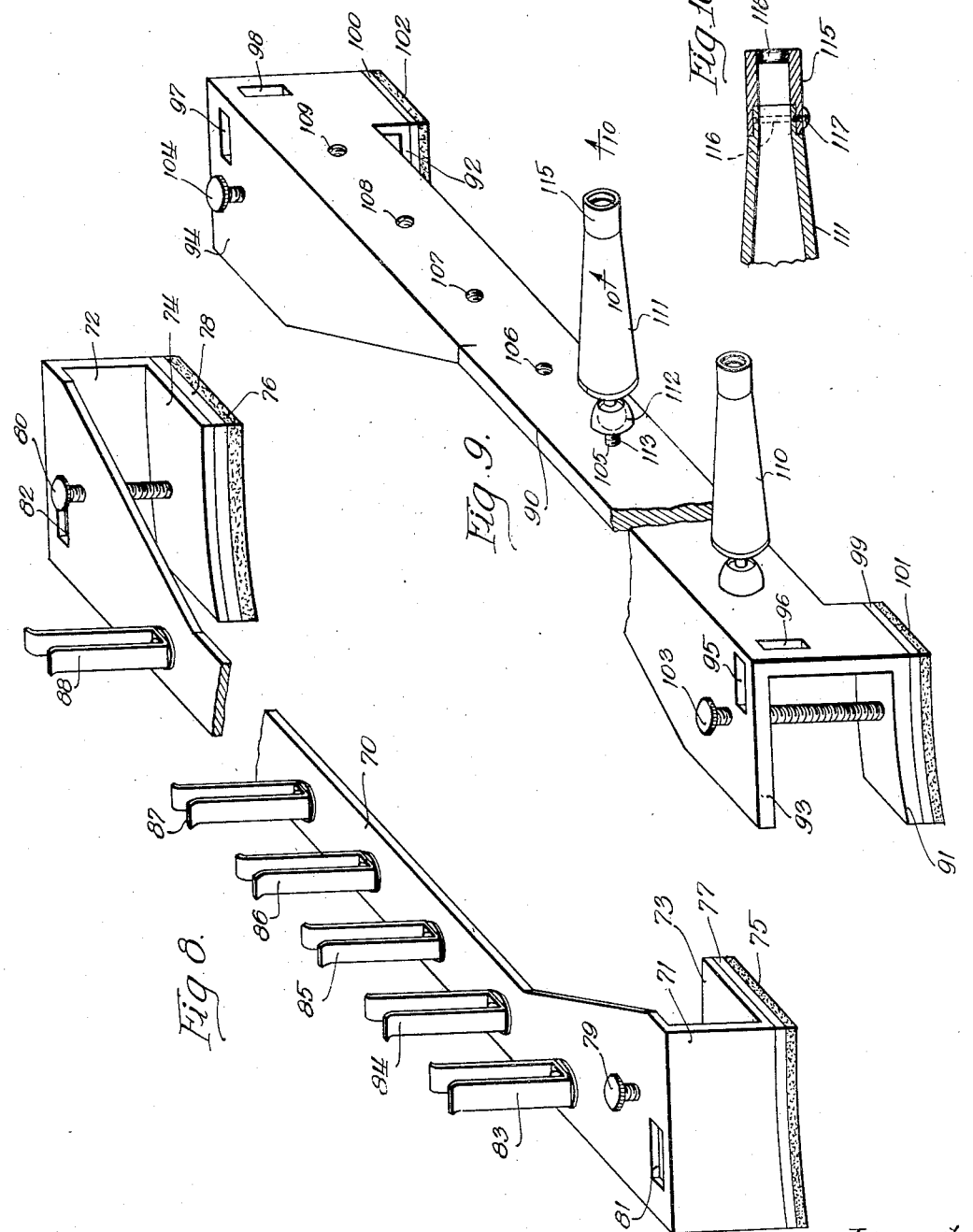

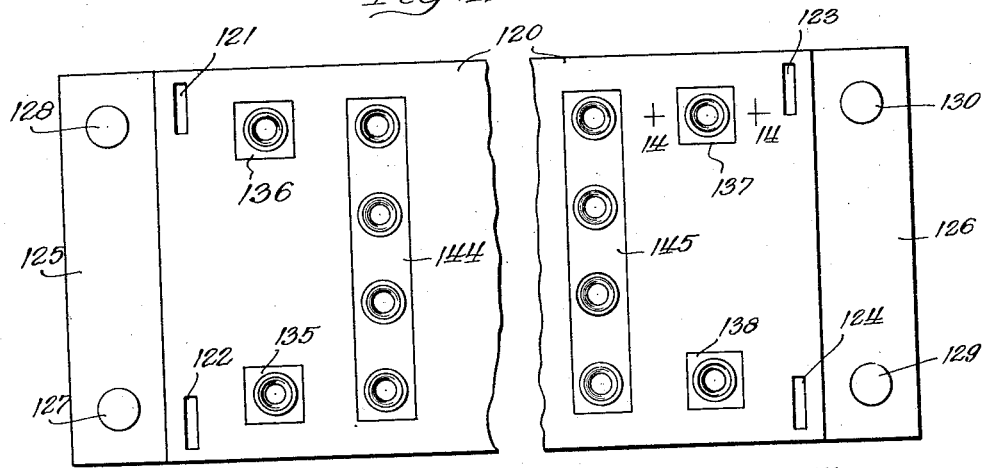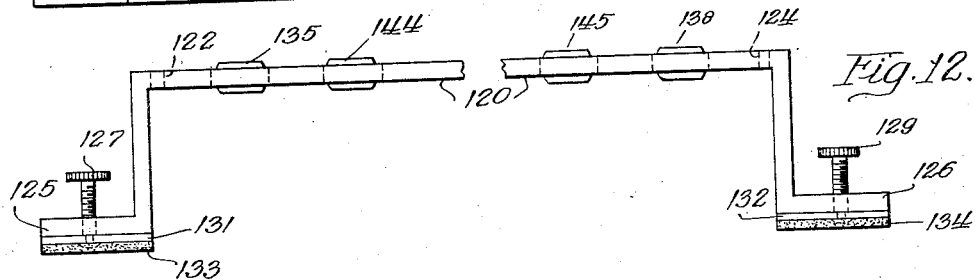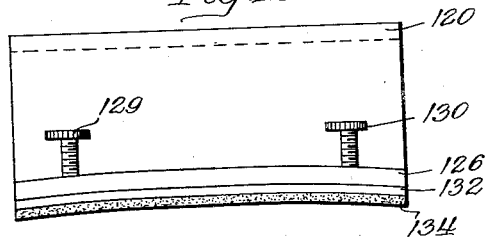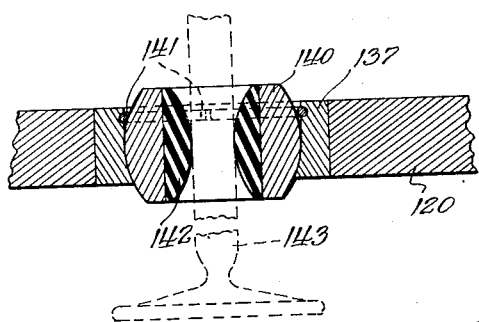

Patented Nov. 21, 1933

1,935,784

UNITED STATES PATENT OFFICE 1,935,784

CLINICAL MULTITHERMOMETER

Oakley Smith, Evanston, Ill.

Application June 21, 1930. Serial No. 462,815

3 Claims. (Cl. 128—2)

This invention relates to a multi-thermometer in general, but is more particularly concerned with a clinical multi-thermometer for diagnostic purposes, that is to say, with a device for simultaneously measuring the temperature of a plurality of variable predetermined surface spots.

Before entering a discussion of my invention, it will be well to review briefly the thoughts underlying the invention. Various symptoms attending certain pathologic conditions of the human body are manifested by certain surface changes appearing on sections of the body which are contributory to the disease or disturbance, or in some way related to it. It is widely agreed upon that certain diseased subcutaneous conditions of the body reflect characteristic symptoms, such as tension, or inflammation which reflect on the surface and manifest themselves by sensitivity to touch, by local tension and by variation in surface temperature. It is desirable to detect and to determine the symptoms objectively by means of proper instruments.

The mercury thermometer is, at the present time, the one standard of measuring temperatures accurately. However, an ordinary mercury thermometer, at the present time, cannot be readily utilized for obtaining the desirable simultaneous observation of several related spots as outlined previously. Neither is it practicable to use the ordinary mercury thermometer for recording the surface temperature of a single spot on account of the time involved which would be required for holding the instrument to the desired spot. It must also be considered that the pressure applied to the thermometer when holding the same to the affected surface spot, plays an important part and may distort the results of the observation.

It is the purpose of the present invention to supply an apparatus and a method for obtaining the surface temperatures of several surface spots simultaneously and objectively and thereby to enable the general practitioner to detect affected spots readily and with objective accuracy. Although the method and the apparatus described in this specification is chiefly intended for the use of the profession of naprapathy in determining temperatures of surface spots for diagnostic purposes, it will be understood that its use is not strictly limited to any particular profession or purpose, but solely to its merits and applicability in any case which calls for the simultaneous selective use of several applicators or operating instruments to a plurality of predetermined surface spots.

The invention consists of an arrangement of a plurality of adjustable supporting units brought into a desired position relative to each other. Each unit has means for suitably supporting a plurality of thermometers, which are placed and adjusted selectively to record the temperatures of certain predetermined spots within the relatively large range and area covered by the supporting units when assembled. With this arrangement, it is merely necessary to place the independent units on the area which is to be examined; to adjust the units properly in place relative to each other; and to insert into each unit a desirable number of suitable surface thermometers. These thermometers are then individually adjusted to the particular spots which are to be measured.

The several objects and features of the invention are briefly outlined in the following statements:

One object of the invention is concerned with the provision of a diagnostic multi-thermometer, comprising a plurality of independent adjustable supporting units each provided with means for receiving and for adjustably holding a predetermined plurality of surface thermometers, and means for adjustably joining said units relative to each other and relative to a given surface.

Another object has to do with the provision of an adjustable support having adjustable joints each provided for receiving and for holding a thermometer or applicator, and a flexible joint for the thermometer or applicator proper, whereby the thermometers or applicators can be readily adjusted to record the surface temperature of several predetermined spots.

Still another object is concerned with the provision of a slidable adjusting means for attachment to a surface thermometer whereby a predetermined pressure can be adjusted for holding the recording end of the instrument in contact with the selected surface spot.

A further object relates to the provision of an adjustable device for vertically and adjustably supporting a predetermined variable number of thermometers or applicators in a predetermined variable relation to each other.

Other objects and features not specifically enumerated above will be brought out in the following detailed description referring to the accompanying three sheets of drawings in which:

Figure 1 shows a diagrammatic representation of two adjoining vertebræ with cross marks indicating spots where the aforementioned symptoms appear and where the recording is desired;

Figure 2 indicates one form of surface thermometer which may be used in connection with certain embodiments of the invention, together with adjustable means for applying pressure to the instrument when used;

Figure 3 illustrates another form of surface thermometer which may be employed with a certain modification of the invention;

Figure 4 shows a flexible joint for holding and for adjusting the surface thermometer illustrated in Figure 2 when the same is attached to certain embodiments of the supporting unit;

Figure 5 is a diagrammatic representation of four supporting units or elements arranged adjustably in desirable relation to each other and each holding a number of surface thermometers. The cross marks in this figure indicate a certain predetermined combination of surface spots for simultaneous temperature measurement;

Figure 6 is a side view of a supporting unit or element in a certain embodiment of the invention;

Figure 7 shows an end view of the unit shown in Figure 6;

Figure 8 illustrates a perspective view of a supporting unit or element in another embodiment of the invention;

Figure 9 is a further modification, showing a different element or unit in perspective;

Figure 10 shows a partial cross-section of an adjustable holder or support on the adjustable unit shown in Figure 9 and is taken on line 10—10 in Figure 9;

Figures 11, 12 and 13 are a top, side and end view respectively, of a further embodiment of the invention, showing an arrangement in which several thermometers, such as is shown in Figure 3, can be used simultaneously in a single support; and Figure 14 is an enlarged cross-section taken on line 14—14 of Figure 11, showing the adjustable joint or socket for receiving and for adjustably holding a thermometer or other applicator.

I will now describe the invention in detail, and first refer to the diagrammatic layout shown in Figure 1.

Numerals 1 and 2 indicate diagrammatically two vertebræ. Numerals 3, 4, 5 and 6 designate the transverse processes, and 7 and 8 indicate the spinous processes. The cross marks on the transverse processes and on the spinous processes indicate the spots where it is desirable to measure the surface temperature posterior to the vertebræ, and the cross marks below the transverse processes indicate the intertransverse spaces where temperature measurements posterior to the vertebræ are to be taken.

Figures 2 and 3, as will be recalled, are surface thermometers which will be understood without elaborate description. Numerals 9 and 9′ indicate the measuring end of the thermometer, the one in Figure 2 being shown bent at right angles to the registration end or column 11. This measuring end 9 and 9′ in Figure 3 is provided with an insulating means applied to the surface. Numeral 10 in Figure 2 indicates a lead slug or suitable weight which is slidable and movable on the recording shaft of the thermometer in order to apply proper pressure when the instrument is used. It is, of course, understood that a similar adjusting means can be used in connection with the instrument shown in Figure 3, if desired.

The details shown in Figure 4 are used in conjunction with the thermometer shown in Figure 2. A suitable rubber tube or hose 12 holding an ordinary wooden rod 13 at one end, may be pushed on the shaft of the thermometer shown in Figure 2 in order to provide a flexible joint and handle for the instrument. The handle is clamped in a suitable adjusting support, as will be described presently.

Several such instruments or applicators as shown in Figure 2, each provided, if necessary and desirable, with a flexible rubber joint and handle, are inserted into a suitable holder or support from which they project laterally. The arrangement is shown in the diagrammatic Figure 5.

Referring now to this Figure 5, it will be seen that there are provided four units or elements 14, 15, 16 and 17. These elements are adjustably joined by means of connecting rods 18 to 25, inclusive, which are provided with slidable joints 26 to 31, inclusive, for adjusting these elements relative to each other. The connecting rods are removably attached to the unit, so that the entire arrangement is detachable and convenient for application, storage and shipment. Four thermometers, each provided, if required, with a flexible joint consisting of a rubber tube and handle are clamped on each of the units 15 and 17, as marked by numerals 32 to 35 and 36 to 39, respectively. Each of the units 14 and 16 holds two thermometers 40—41 and 42—43, respectively.

The thermometers are clamped in the units so that they are laterally slidable. The flexible joint provided on each thermometer permits further adjustment, and it will, therefore, be seen that the thermometers can be easily adjusted relative to each other to record the temperatures of several predetermined surface spots within the range covered by the supporting elements and the flexible holders. The cross marks denote a certain combination of surface spots for measurement. This, of course, means that any desired combination of points or spots can be adjusted. In other words, a plurality of thermometers can be supported and adjusted relative to each other to record, simultaneously, the surface temperatures of a predetermined corresponding number of variable predetermined surface spots. It will be understood, of course, that the capacity of the supporting elements or units is not by any means limited to the number of thermometers as shown in Figure 5. More or less instruments or applicators may be attached as desired within the holding capacity of each of the supporting units, and may be adjusted relative to each other, in fact, in an unlimited number of combinations within the range and area of the supporting units. The registration will be simultaneous and direct. An additional thermometer may be attached to one of the supporting units for registering the room temperature. It will also be understood that the thermometers, or some of them, may be adjusted to record the temperatures outside of the area covered by the supporting units if desired.

Each of the units is provided with movable knobs or set screws 44—45, 46—47, 48—49 and 50—51, respectively, for adjusting each unit individually in place.

The above description with reference to Figure 5, shows the gist of the invention. The details of carrying the same into effect are given below with reference to other figures which show several embodiments and modifications of supporting elements or units.

In Figures 6 and 7 is shown one embodiment of a supporting unit, comprising two end members 52 and 53, held together by means of suitable rods or distance members, such as 54 which are attached by screws, such as 55, 56 and 57. A spring 58 is mounted between the end members 52 and 53 for receiving the thermometers, which may be clamped between the coils of the spring in a simple and self-evident manner. Each end member is provided with a projection, such as 59 and 60, for receiving an adjusting screw 61 and 62, respectively. Vertically slidable brackets 63 and 64, respectively, are provided on the end members, each having an angular projection 65 and 66, respectively, for engagement with the corresponding adjusting screw. These slidable brackets are provided with felt pads or the like, 67 and 68, respectively, which represent the rests on which the unit is placed when applied to a patient's back for taking temperature measurements. It will be seen that the lower portion of the end members and of the felt rests, is slightly curved, sloping from left to right in the view shown in Figure 7. This curve is so proportioned as to fit, approximately, the curvature of the back. The adjusting screws, when operated, will move the slidable end brackets and therefore the felt pads, and the units will be thereby conveniently adjusted in place. Suitable slots or grooves may be provided in these end members for tying several units together by means of adjustable rods.

With the foregoing in mind, the embodiment shown in Figure 8 will be easily understood. The supporting unit shown in this figure consists of a pressed or stamped metal member having a bridge 70 and ends 71, 72, the ends being spaced to form laterally curved extensions 73 and 74 which are disposed substantially in parallel to the bridge 70. Felt pads or the like 75 and 76 are attached to suitable plates 77 and 78, which are individually adjustable by means of adjusting screws 79 and 80, respectively, as shown. Slots 81 and 82 are provided in the bridge portion 70 for receiving rods designed to tie several such units together substantially as discussed in connection with Figure 5. A number of elongated U-shaped springs with flaring ends are rotatably mounted on top of the bridge 70 for receiving the thermometers as already explained. These spring members are designated by numerals 83 to 88, inclusive. A detailed discussion of the rotatable mounting of the spring members is omitted, since any approved and suitable method of mounting these springs so that they can easily rotate can be utilized to advantage.

Figure 9 illustrates a further embodiment of the invention, showing a supporting unit which comprises again a pressed or stamped metal member having a face 90 and ends shaped to form suitable rests, each end having a lower curved portion 91 and 92, and an upper counter portion 93 and 94 respectively. Slots 95—96 and 97—98 are provided for attaching connecting rods to arrange several such units in a suitable predetermined assembly. The curved end portions 91 and 92 are each provided with suitable adjustable plates 99 and 100, respectively, and attached to each of these plates is a felt pad or the like, such as indicated at 101 and 102. These plates are vertically adjustable by means of the adjusting screws 103 and 104.

There are several threaded holes, such as 105 to 109, provided on the face 90 of the support. Adjustable thermometer holders each having a ball socket or other suitable joint, may be screwed into the holes in a simple manner. One such holder, designated by numeral 110 is shown attached to the transverse face 90, and one holder 111 is shown partly removed from the same.

Referring to the holder 111 and to the partial cross-section thereof shown in Figure 10, the holder comprises a ball socket or other suitable joint 112 provided with a threaded extension 113 which may be screwed into one of the threaded holes in the face 90. This joint socket holds, rotatably, a tapering tubular holder provided at its end with a rotatable head or tip 115. The tapering holder is offset and provided with an annular groove 116, and the head 115 is reset and provided with screws such as 117. It is merely necessary to push the reset head member onto the offset end of the tapering holder and to tie the screws 117 until the tips engage the annular groove 116. The head is then easily rotatable on the holder. A rubber ring 118 is inserted into the head 115. The thermometer is simply inserted into the holder, and will be held by this rubber ring. It will be adjustable in every direction due to the joint 112 and further adjustment is possible due to the rotatable head on each holder. I have provided the rotatable head in order to permit fine and final adjustment of each thermometer as the joint 112 on the holder will preferably be adjusted to hold the projecting holder somewhat tight, necessitating some force for rotating the same. The rotatable tip or head, however, may very easily turn and permit fine adjustment.

The embodiment illustrated in Figures 11, 12 and 13 represents a departure from what has been described above, inasmuch as it shows a common support for several thermometers of a different type, namely, the one shown in Figure 3. This embodiment consists of a base shaped as shown, with the ends forming convenient adjustable brackets for setting the instruments. The bridge 120 is provided with slots 121 to 124 for receiving connecting rods if it is desired to use this support together with other supports. The ends 125 and 126 are provided with adjusting screws 127, 128, 129, 130, for moving suitable plates 131 and 132, respectively, to which are attached felt pads or the like, such as 133 and 134. The ends may be slightly curved as shown in Figure 13 to suit the contour of the back when the support is used, or the plates 131 and 132 may be flexible and rigidly secured at the center of the ends 125 and 126. When this is the case and the adjusting screws are moved, it will be apparent that the flexible plates will move the felt pad attached to it to conform to any curve which is desired or to conform to a plane surface.

Sockets, such as 135 to 138, inclusive, are attached to the portion 120 of the support and in each of these sockets is a rotatable ball joint or similar joint, such for example as is shown in the enlarged cross-section of the socket 137, illustrated in Figure 14.

It will be seen from Figure 14 that the socket 137 holds a tubular member, the periphery of which is spherical with the ends cut away. This member is set into the socket 137 which is shaped to form a seat for the member 140 as is shown, and which is secured by means of a spring 141 attached to an annular groove in the socket 137. The member 140 is by this simple arrangement free to rotate within the socket 137. A rubber ring 142 is inserted into the member 140 for holding the thermometer 143 indicated by dotted lines. Sockets such as 144 and 145 each holding a plurality of movable holders as the one just described are shown attached to the portion 120 of the support. The particular arrangement of the several holders and their relation to each other is, of course, determined by the particular use to which the device is put, that is to say, by the number and relation of variable surface spots which are to be put under observation or treatment.

As I have mentioned previously, the invention is not limited and is not intended to be limited in its application solely to the profession of naprapathy or solely to the use as a clinical multi-thermometer. It may be utilized in other professions, and it may serve a variety of purposes, such for example as in the case of electro-therapy as a holder for certain instruments or electrodes operating on a certain surface. Straps or belts may be provided for attaching the unit or units to a surface.

The shape may be changed beyond the modifications and embodiments which I have shown and described, either entire or in detail, and I therefore, desire it to be understood that I am aware of the possibility of introducing changes or putting the device to different use. I desire to use and to apply the invention within the limits and within the scope of the claims which follow, and in which I have defined what I believe new and distinguishing in the art.

I claim:

1. An apparatus for holding instruments comprising a plurality of supporting units adapted to be brought into parallel relation with the subject-matter in connection with which the instruments are used, means for adjustably securing said supporting units together about an included area, each said supporting unit including a plurality of means spaced longitudinally thereof for detachably engaging instruments, said means providing longitudinal, pivotal and rotary movements of instruments while subject to engagement.

2. An instrument for holding thermometers with their bulbs in pattern relation in a substantially uniform plane comprising a supporting structure adapted for parallel disposition with respect to said plane, said supporting structure including a plurality of means mounted in spaced relation longitudinally of said structure, each such means being adapted to releasably engage a thermometer and holding the same yieldingly in adjusted position, said means providing longitudinal, pivotal and rotary movements of the associated thermometers for adjustment during engagement.

3. An instrument for holding thermometers with their bulbs in pattern relation comprising a supporting structure including a plurality of means mounted in spaced relation longitudinally of said supporting structure, each such means being adapted to receive and engage a thermometer and providing independent, longitudinal, pivotal and rotary movements of said thermometer for adjustment and the yielding support thereof when adjusted.

OAKLEY SMITH.